(12) United States Patent
Thomsen

(10) Patent No.: US 9,914,178 B2
(45) Date of Patent: Mar. 13, 2018

(54) DRILLING TOOL AND METHOD FOR MODIFYING A BLIND HOLE

(71) Applicant: WPT Nord GmbH, Kiel (DE)

(72) Inventor: Ralf Thomsen, Sprenge (DE)

(73) Assignee: WPT Nord GmbH, Kiel (DE)

( * ) Notice: Subject to any disclaimer, the term of this patent is extended or adjusted under 35 U.S.C. 154(b) by 228 days.

(21) Appl. No.: 14/731,854

(22) Filed: Jun. 5, 2015

(65) Prior Publication Data
US 2016/0082523 A1 Mar. 24, 2016

(30) Foreign Application Priority Data
Sep. 22, 2014 (DE) .................... 20 2014 007 558 U

(51) Int. Cl.
*B23B 51/00* (2006.01)
*B23B 51/02* (2006.01)
(Continued)

(52) U.S. Cl.
CPC ............ *B23B 51/0009* (2013.01); *B08B 5/04* (2013.01); *B23B 49/005* (2013.01); *B23B 51/02* (2013.01); *B23Q 11/006* (2013.01); *B23Q 11/0075* (2013.01); *F03D 1/0633* (2013.01); *F03D 3/061* (2013.01); *F03D 80/50* (2016.05); *B23B 2215/76* (2013.01); *B23B 2251/082* (2013.01);
(Continued)

(58) Field of Classification Search
CPC .. F03D 1/0658; F03D 80/50; F03D 2260/301; Y02E 10/721
See application file for complete search history.

(56) References Cited

U.S. PATENT DOCUMENTS 2,603,817 A    7/1952   Anthony
4,272,929 A *  6/1981   Hanson ................... E02D 27/42
                                                  416/142

(Continued)

FOREIGN PATENT DOCUMENTS

DE         2948006 A1    6/1981
DE        20202580 U1    5/2002
(Continued)

OTHER PUBLICATIONS

Lekou et al, Report on Repair Techniques for composite parts of Wind Turbine blades, 2002, Optimat Blades, pp. 1-15.*
(Continued)

*Primary Examiner* — Jacob Cigna
(74) *Attorney, Agent, or Firm* — Wood Herron & Evans LLP

(57) ABSTRACT

The present invention relates to a drilling tool and method for modifying a blind hole in a blade root insert of a wind turbine. The invention further relates to an apparatus and method for cleaning a blind hole. The method for modifying a blind hole comprises: removing a blade screw located in the blind hole, inserting a drilling tool into the blind hole, fixing the drilling tool in a drill, recessing the blind hole by a predetermined depth, with a maximum diameter of the end section and of the hole bottom after recessing being smaller than or equal to a diameter of the end section prior to recessing and a transition from the end section to the hole bottom being round after recessing, removing the drilling tool and the drill, mounting the blade screw in the modified blind hole.

12 Claims, 5 Drawing Sheets

(51) Int. Cl.
*B23Q 11/00* (2006.01)
*B08B 5/04* (2006.01)
*B23B 49/00* (2006.01)
*F03D 1/06* (2006.01)
*F03D 3/06* (2006.01)
*F03D 80/50* (2016.01)

(52) U.S. Cl.
CPC ..... *B23B 2251/125* (2013.01); *B23B 2251/14* (2013.01); *B23B 2251/18* (2013.01); *B23B 2260/0482* (2013.01); *Y02E 10/721* (2013.01)

(56) References Cited

U.S. PATENT DOCUMENTS

| | | | |
|---|---|---|---|
| 7,296,954 B2 | 11/2007 | Haenle | |
| 2005/0147478 A1 | 7/2005 | Greenberg | |
| 2009/0185878 A1* | 7/2009 | Turrini | B23C 5/10 409/132 |
| 2010/0158661 A1* | 6/2010 | Dawson | B23P 6/00 415/4.3 |
| 2011/0044817 A1* | 2/2011 | Bendel | F03D 1/0658 416/204 R |
| 2012/0207607 A1* | 8/2012 | Mironov | F03D 1/0658 416/204 R |
| 2015/0071701 A1* | 3/2015 | Raina | F16B 11/006 403/266 |
| 2016/0195061 A1* | 7/2016 | Guenther | F03D 1/0658 416/204 A |
| 2016/0290313 A1* | 10/2016 | Zwart | F03D 1/0658 |

FOREIGN PATENT DOCUMENTS

| | | | | |
|---|---|---|---|---|
| DE | 102004055198 A1 | | 5/2006 | |
| DE | 202011101634 | * | 7/2011 | ........... F03D 1/0658 |
| EP | 0029980 A2 | | 6/1981 | |
| EP | 2623771 A1 | | 8/2013 | |
| GB | 2184046 A | | 6/1987 | |
| GB | 2438051 A | * | 11/2007 | ............ F16B 37/122 |
| GB | 2496869 A | | 5/2013 | |
| GB | 2501001 A | | 10/2013 | |
| JP | 2009039811 A | | 2/2009 | |
| WO | WO 2008128035 A1 | * | 10/2008 | ............... B23C 5/10 |
| WO | WO 2012021206 A2 | * | 2/2012 | ............... B23C 5/10 |
| WO | 2016001262 A1 | | 1/2016 | |

OTHER PUBLICATIONS

European Patent Office, European Search Report in EP Application No. 14192021, dated Jul. 14, 2016.

* cited by examiner

DRILLING TOOL AND METHOD FOR MODIFYING A BLIND HOLE

CROSS-REFERENCE TO RELATED APPLICATIONS

This application claims the benefit of priority of German Application No. 202014007558.1, filed Sep. 22, 2014, the disclosure of which is herein incorporated by reference.

The present invention relates to a drilling tool and method for modifying a blind hole in a blade root insert of a wind turbine. The invention further relates to an apparatus and method for cleaning a blind hole.

Normally, the rotor blades of wind turbines are attached to the rotor hub by means of blade root inserts that normally comprise blind holes, into which blade screws are screwed, with which the rotor blade can be fixed.

Some wind turbines may suffer damages to the blade root inserts, in particular cracks coming from the blind holes, which damages may be further increased also, and especially, by the high dynamic load on the rotor blades during operation of the wind turbine. In extreme cases, the damages to the blade root inserts may result in the rotor blades breaking off. Such uncontrolled loss of a rotor blade of a wind turbine especially during operation of the wind turbine poses a great risk and requires repair and/or replacement work that is time-consuming, costly, and complex.

To remedy or avoid such damages, EP 2 623 771 A1 suggests to mill out the bottom of the blind hole to thus reduce or prevent cracking. However, this is a very elaborate process where the hub of the wind turbine has to be dismounted and the rotor blades have to be transported individually to the place of repair, as described, for example, on page 4 in the $19^{th}$ edition of E.ON Anlagenservice's customer magazine "Journal" from September 2012. Following such repair, the rotor blades must be again mounted to the wind turbine's nacelle or hub. This is a very time-consuming task, and the wind turbine is nonoperational for quite a long time. The dismounting and mounting of the rotor blades normally also requires the use of a truck-mounted crane, which is not only expensive, but depending on availability also results in additional downtimes of the wind turbine.

One object of the present invention is thus to provide an apparatus and method for modifying a blind hole in a blade root insert of a wind turbine which will reduce or eliminate one or more of the aforementioned disadvantages.

The present invention solves this problem by providing a drilling tool for modifying, in particular for recessing, a blind hole with a thread section, an end section following such thread section, and a hole bottom following such end section in a blade root insert of a wind turbine, with the rotor blade being in mounted position, with a drill section and a handling section, one drill bit of the drill section having two main cutting edges and one dead center, characterized in that a maximum diameter of the drill section is smaller than or equal to a diameter of the end section of the blind hole and a radially outer end of the two main cutting edges is rounded, having—in particular—a radius of at least 4 mm.

The invention and its various aspects are based, in particular, on the finding that when using a drilling tool according to the invention, the blind hole in the blade root insert can be modified while the rotor blade is still mounted, so that the rotor blade does not have to be dismounted and then again mounted afterwards. The invention is moreover also based on the finding that, as described in EP 2 623 771 A1, existing modification methods have the disadvantage that the material of the blade root insert is weakened by the milling process because the material thickness between the milled-out end section or hole bottom of the blind hole and the outer surface of the blade root insert is reduced in an area that is anyhow prone to cracking. Based on this finding, the invention provides for the drilling tool to have a maximum diameter in the drill section that is smaller than or equal to the diameter of the blind hole's end section and for the blind hole to be recessed or prolonged when modifying the blind hole (as described in more detail hereinafter) without, however, radially widening the blind hole and thus weakening the material through a reduction of the cross section of the blade root insert in radial direction.

To modify the disadvantageous edge between the end section and the hole bottom of existing blind holes in blade root inserts, which edge promotes cracking, the roundness of the radially outer ends of the two main cutting edges of the drilling tool results moreover in a rounded transition between the end section and the hole bottom upon modification of the blind hole during recessing of the blind hole.

With the drilling tool according to the invention one can hence modify an existing blind hole of a blade root insert such as to not enlarge the blind hole in radial direction while, at the same time, creating a rounded transition from the end section to the hole bottom.

Another crucial advantage of the drilling tool according to the invention is that with such drilling tool, which can be fixed in a drill and used to modify a blind hole, in particular to recess the blind hole, the blind hole—upon removal of a blade screw screwed into said blind hole—can be modified on site at the nacelle or in the hub with the rotor blade still mounted.

Since (especially during standstill of the wind turbine, as necessary in case of maintenance or repair) one part of the plurality of blade screws provided to fix the rotor blade may be removed without having to dismount the rotor blade or endangering the rotor blade's secure mounting during standstill, the drilling tool according to the invention can be used to successively modify each and every blind hole of a blade root insert. Since the drilling tool (to be inserted in the blind hole instead of the blade screw for modification purposes) may be inserted in the blind hole before it is fixed in a drill, one requires merely installation space above the blind hole's opening in longitudinal direction that allows to fix the drilling tool in the drill and operate the drill. After modification, the drill can be detached from the drilling tool before removing the drilling tool from the blind hole. Furthermore, only an axial recess by means of the drilling tool fixed in the drill is provided during modification, meaning that no operating space or counter surface is required for radial milling, which is particularly advantageous given the constricted room when the rotor blade is in mounted position.

One preferred further embodiment of the drilling tool provides for the dead center to be rounded, in particular to have a radius of at least 4 mm. The fact that the dead center is rounded, as well, is advantageous as during modification and recessing of the blind hole even the lowermost point of the hole bottom created by the dead center shows no sharp edges or tips but a rounded edge. This will also further reduce or prevent cracking in this area.

What is further preferred are minor cutting edges provided at the drill section starting from the drill bit, with the minor cutting edges being dulled meaning, in particular, that the minor cutting edges are ground smaller in diameter to prevent the existing thread from being damaged during drill immersion.

Another preferred embodiment of the drilling tool provides for an adjuster to be arranged at the handling section which is designed to prevent the drilling tool from penetrating the blind hole beyond a predetermined, adjustable depth, which will preferably result in a radial channel. Said adjuster may form, for example, a stop up to which the drilling tool may enter the blind hole during recessing, whereas further penetration beyond said stop point will be prevented, for example because the stop has a larger diameter than the opening of the blind hole. This way, one can easily prevent the blind hole from being recessed too much during modification.

The handling section preferably comprises an external thread and the adjuster an internal thread, with the handling section's external thread being engaged with the internal thread so that the predetermined depth can be preferably adjusted by rotating the adjuster about the handling section. This embodiment provides for an easy and practicable way of presetting the predetermined depth up to which the drilling tool may be inserted in the blind hole. The distance between the adjuster and the drill bit hence adds up to the length of the blind hole after modification or recessing.

What is provided according to another aspect of the invention is a cleaning apparatus for cleaning a blind hole, in particular following modification, comprising a pneumatic pipe that can be connected to a pneumatic source whose diameter is smaller than the diameter of the blind hole to be cleaned, a suction pipe that can be connected to a vacuum source whose diameter is preferably larger than the diameter of the blind hole to be cleaned, with one section of the pneumatic pipe running within the suction pipe and a first end of the pneumatic pipe projecting beyond a first end of the suction pipe in longitudinal direction of the pneumatic pipe.

This aspect of the invention is, inter alia, based on the finding that the material remaining after modification of a blind hole of a blade root insert, such as cuttings, must be removed from the blind hole before the blade screw can be again screwed into the modified blind hole. Compared to known puff blowing, the cleaning apparatus according to the invention allows for a reliable cleaning of the blind hole without cuttings entering the adjacent ball bearing (pivot bearing of the blade) during cleaning. Since a first end of the pneumatic pipe extends beyond a first end of the cleaning apparatus' suction pipe in longitudinal direction, the pneumatic pipe can be immersed into the blind hole further than the suction pipe. The suction pipe can also remain outside of the blind hole at the latter's opening, whereas the first in the pneumatic pipe extends into the blind hole. This way, compressed air from the first end of the pneumatic pipe can be introduced far into the blind hole and sucked off through the blind hole's open end by creating a vacuum in the suction pipe. This will create a current essentially from the closed end of the blind hole to the open end of the blind hole and better remove cuttings from the blind hole also at its closed end.

Preferably, the distance between the first end of the pneumatic pipe extending from the first end of the suction pipe and the first end of the suction pipe is at least 50% of the length or depth of the modified blind hole, in particular at least 60%, at least 70%, at least 80% or at least 90%.

It is furthermore preferred for the pneumatic pipe to be arranged movably relative to the suction pipe, in particular in longitudinal direction of the pneumatic pipe. This way, the distance between the first end of the pneumatic pipe and the first end of the suction pipe can be changed, such as to allow for an adjustment to blind holes with different depths or lengths. The cleaning apparatus can be also design such as to allow for a complete retraction of the first end of the pneumatic pipe into the suction pipe, for example in a transport position, and in operational position in longitudinal direction of the pneumatic pipe for such displacement within the suction pipe that the first end of the pneumatic pipe projects beyond the first end of the suction pipe, preferably in the preferred length that is adjusted to the length or depth of a modified blind hole.

According to yet another aspect of the invention, the problem mentioned in the beginning is solved by a method for modifying a blind hole with a thread section, an end section following such thread section, and a hole bottom following such end section in a blade root insert of a wind turbine, with a rotor blade in mounted position, comprising: removing a blade screw located in the blind hole, inserting a drilling tool, preferably a drilling tool of the above-described type, into the blind hole, fixing the drilling tool in a drill, recessing the blind hole by a predetermined depth, with a maximum diameter of the end section and of the hole bottom after recessing being smaller than or equal to a diameter of the end section prior to recessing and a transition from the end section to the hole bottom being round after recessing, preferably with a radius of at least 2 mm, preferably at least 4 mm, removing the drilling tool and the drill, mounting the blade screw in the modified blind hole, in particular by taking into account a maximum torque.

The method provides for the blade screw to be first removed prior to modification of the blind hole before the blind hole is recessed by means of a drilling tool that is first inserted in the blind hole and then fixed in a drill. The recess is not performed randomly but by a predetermined depth that can be preferably adjusted at the drilling tool, as described hereinabove. Moreover, only the longitudinal expansion of the blind hole and not its radial expansion is enlarged during recessing. When removing the drilling tool and drill, one will preferably first remove the drill from the drilling tool and then pull the drilling tool from the blind hole. If permitted by the local conditions at the rotor blade that is mounted on the rotor hub, the drilling tool can also be inserted in and/or removed from the blind hole while still fixed in the drill. However, since the drilling tool can be fixed in, or removed from, the drill while already or still located in the blind hole, it can be also used in very constricted conditions.

After modification, the blade screw is again mounted in the now modified blind hole. Temporary removal of the blade screw that is located in the blind hole to be modified can take place with the rotor blade still mounted, meaning that the rotor blade does not have to be dismounted and then again mounted.

Preferably, this method can be improved by cleaning the blind hole after recessing, preferably by introducing compressed air into the area of the end section and/or hole bottom of the blind hole and, preferably simultaneously, sucking off air in the area of the blind hole's opening, in particular by means of a cleaning apparatus of the above-described type.

The introduction of compressed air into the blind hole, in particular in the area of the end section and/or hole bottom of the blind hole, and suction of air in the area of the blind hole's opening allows for easier removal of chips, in particular cuttings, from the blind hole and thus more profound cleaning.

Another preferred embodiment of the method provides for checking the end section and/or hole bottom of the blind hole for possible cracks in the blade root insert prior to modification of the blind hole, in particular prior to recessing the blind hole, which checking is to be preferably performed by means of an eddy current test method. Said checking for damages, such as cracks in the blade root insert, is vital to assessing whether repair by means of blind hole modification is still possible or whether the damages to the blade root insert are so serious that replacement of the blade root insert or of the entire rotor blade can no longer be avoided. This test can also help you see not only whether modification of the blind hole is necessary but also whether existing damages, such as cracks, can or must be repaired.

This method can be also further improved by checking the hole bottom of the blind hole after modification, in particular for asperities, such as grooves, notches or sharp edges, preferably after recessing the blind hole, such test to be preferably performed by means of videoscopy. This test can help ensure the absence of asperities after modification which might result in cracking.

What is furthermore preferred in this context is to document the end section after modification, in particular after recessing the blind hole, with such documenting to preferably take place in form of taking photographs of the blind hole, in particular of the end section. This way, the condition of the blind hole existing after modification can be captured.

What is furthermore preferred is an improvement of the method where the predetermined depth prior to recessing of the blind hole is adjusted at the drilling tool, preferably by means of an adjuster, with such adjustment to preferably take place before the drilling tool is fixed in the drill. As described hereinabove, one can thus preset the blind hole length or depth to be achieved through modification at the drilling tool to thus easily prevent an excessive recessing of the blind hole.

Another preferred embodiment of the method provides for the closing, through welding, of a crack in the blade root insert detected during inspection of the end section and/or hole bottom, with such welding of cracks in the blade root insert to preferably take place before recessing the blind hole. If damages, such as cracks, are detected during the inspection of the end section and hole bottom and if an evaluation has shown that such cracks can be repaired, it is intended to close such cracks through welding.

What is particularly preferred in this context is to arrange a cooling element between the prepared welding seam and a GRP bond of the rotor blade, preferably at a rear side of an area where the welding seam is to be applied, and to preferably capture and preferably document a temperature during welding, in particular in the area of the GRP bond of the rotor blade. This is particularly preferred since glass-fiber reinforced plastic (GRP), which is often used in rotor blades, is mostly very sensitive to temperature and since it must be ensured during welding of cracks in the blade root insert to not introduce too high temperatures to the rotor blade, in particular to the rotor blade's GRP bond.

According to yet another aspect of the invention, the problem mentioned in the beginning is solved by a method for modifying several blind holes in a blade root insert of a wind turbine with the rotor blade being in mounted position, comprising: removing one part of the blade screws located in the blind holes in a blade root insert, especially removing the blade screws from every other blind hole, preferably with the blade screws and/or blind holes having been previously numbered, modifying the blind holes from which the blade screw was removed according to a previously described method.

As already described hereinabove, it is possible to remove several blade screws, especially if the wind turbine stands still, in particular up to 50% of the blade screws, without having to dismount the rotor blade. This way, it is possible to remove several blade screws from their respective blind hole, in particular every other blade screw, and modify such blind holes. The blade screws are then preferably returned to the modified blind holes. In a next method step, the blade screws are removed from the yet unmodified blind holes which are then modified. Preferably, two adjacent blade screws of a blade stop are removed in pairs, the reason being that two blind holes are worked on in parallel and that the cleaning apparatus can be thus better positioned.

What is provided for according to yet another aspect of the invention is a method for cleaning a blind hole with a thread section, an end section following such thread section, and a hole bottom following such end section, in particular after modification or recessing of the blind hole, comprising: introducing compressed air in the area of the hole bottom and/or end section of the blind hole and, preferably simultaneously, sucking off air in the area of an opening of the blind hole.

As regards the further advantages, embodiment variants, and embodiment details of said further aspects of the invention and their further developments, reference is also made to the above description of the respective apparatus features. Preferred exemplary embodiments of the invention are described based on the enclosed figures.

Figure 1:
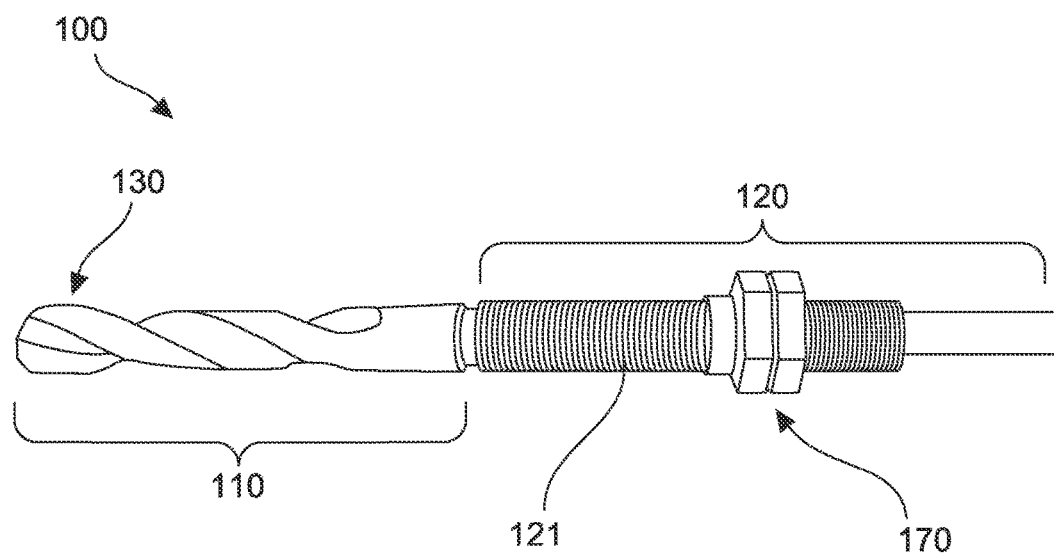
FIG. 1 shows an exemplary embodiment of a drilling tool according to the invention.
Figure 2:
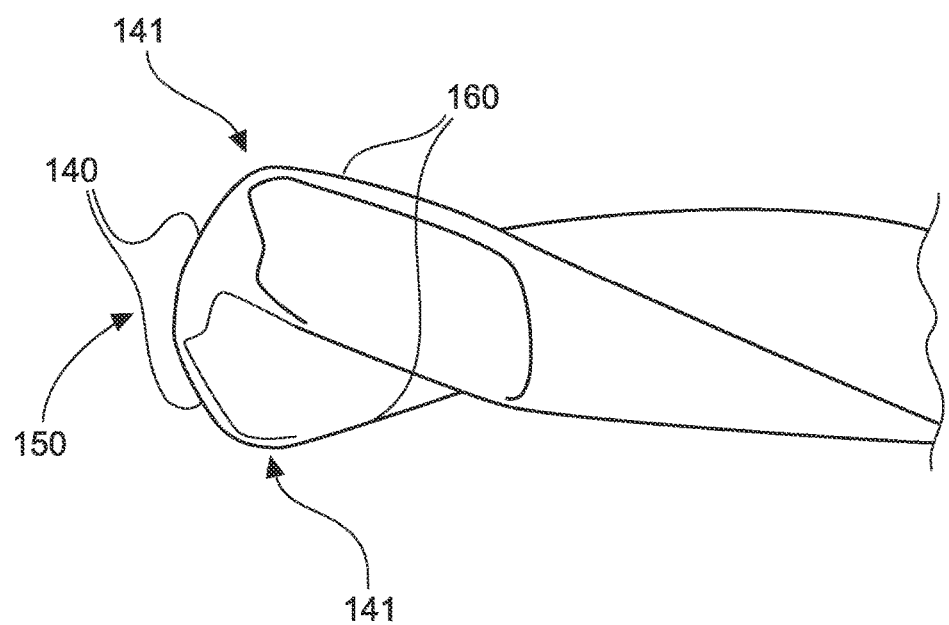
FIG. 2 shows an enlarged detail of FIG. 1.

The drilling tool 100 for modifying a blind hole, which is shown in FIGS. 1 and 2, comprises a drill section 110 and a handling section 120. A drill bit 130 with two main cutting edges 140 and a dead center 150 is provided at drill section 110. Minor cutting edges 160 are moreover provided at drill section 110. An external thread 121 is provided at handling section 120, to which an adjuster 170 with an internal thread is screwed. The adjuster 170 is designed as an adjusting nut with a guide band and serves to adjust the drilling depth with drilling tool 100, meaning that the penetration of the drilling tool 100 into the blind hole can be set to a predetermined depth by adjusting the adjuster 170 accordingly so as to prevent the drilling tool 100 from drilling beyond said predetermined depth. Because of the thread connection between handling section 120 and adjuster 170, the predetermined depth can be easily adjusted by rotating the adjuster 170 about the handling section 120. In addition, the depth stop sleeve serves also as a radial guide.

The maximum diameter of the drill section 110 is adjusted to the blind holes to be modified such that the maximum diameter of the drill section 110 is smaller than or equal to the diameter of the end section of the blind hole prior to its modification. This way it is ensured that the drilling tool 100 will not widen the blind hole radially.

To eliminate unrounded edges when recessing the blind hole, which might result in cracking, the radially outer ends 141 of the two main cutting edges 140 are rounded with a radius of 4 millimeters in the example shown in FIGS. 1 and 2. This way, one can achieve the geometry shown in FIG. 6 with a rounded transition 1010' between end section 12' and hole bottom 13'.

Figure 6:
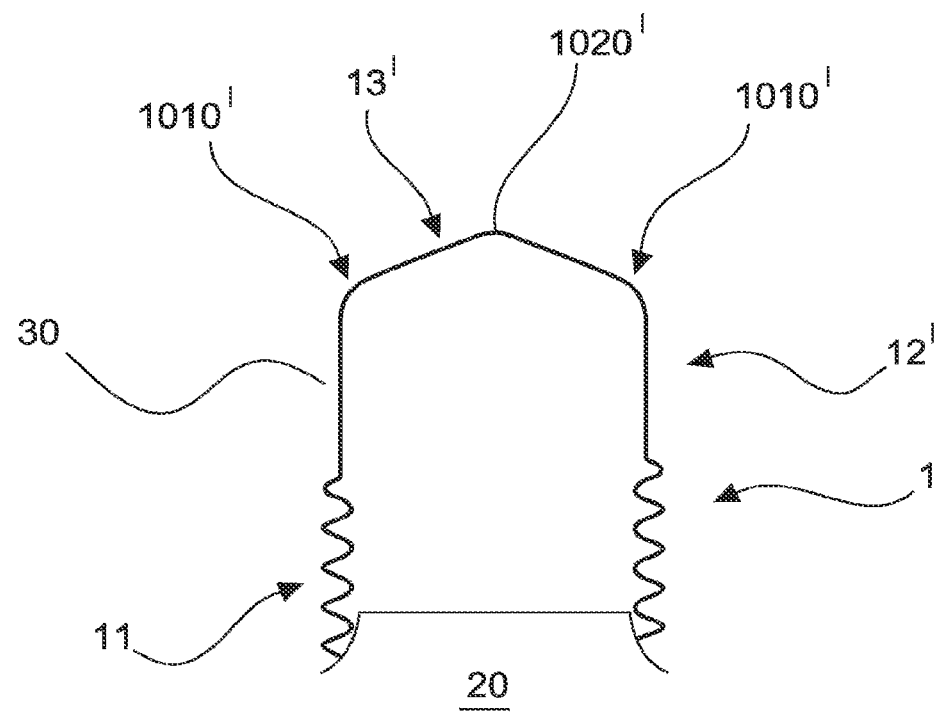
FIG. 6 shows the blind hole according to FIG. 5 after modification.

The dead center 150 of the drilling tool 100 is furthermore rounded to produce the rounded tip 1020' shown in FIG. 6 at the hole bottom 13' of the modified blind hole also after recessing.

The minor cutting edges 160 are dulled and they are ground smaller in diameter to prevent the existing thread from being damaged during drill immersion.

Figure 3:
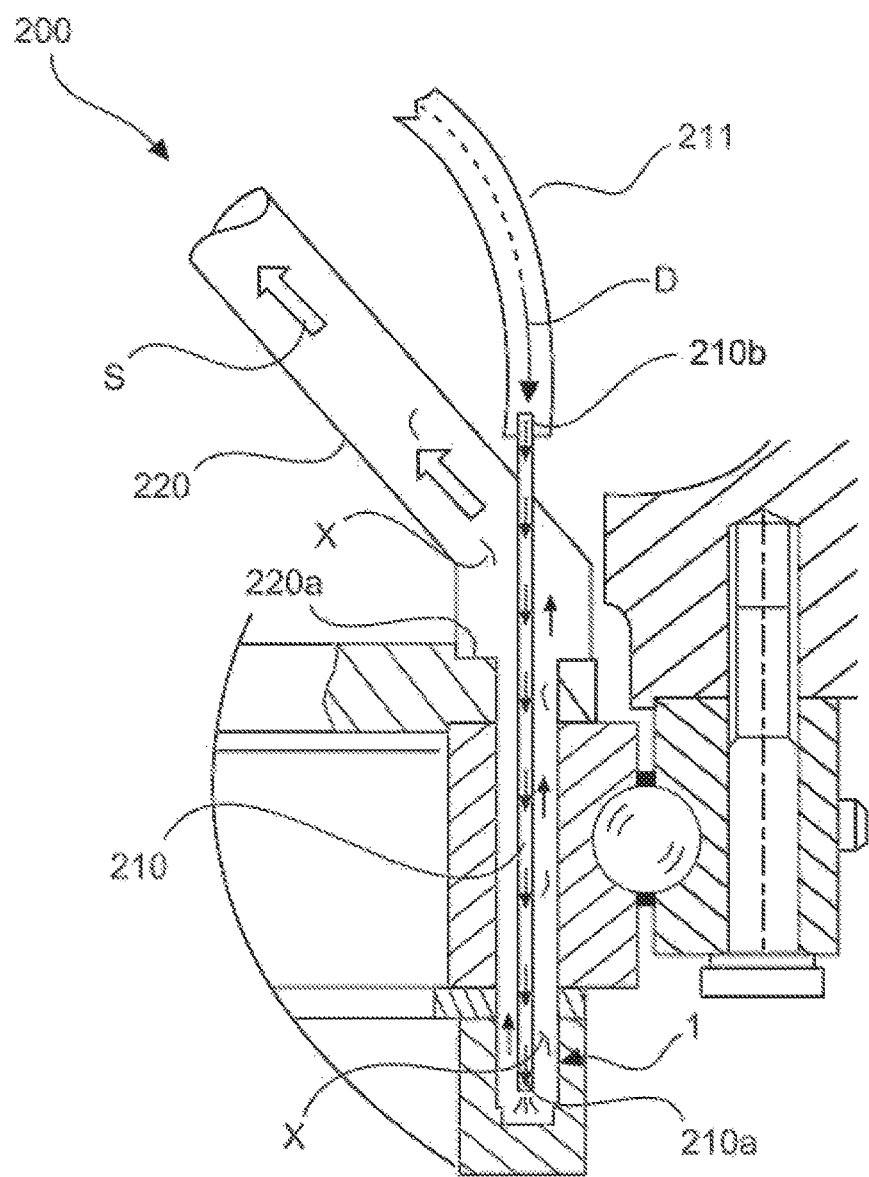
FIG. 3 shows an exemplary embodiment of a cleaning apparatus according to the invention.

FIG. 3 shows a cleaning apparatus 200 that can be used to remove cuttings X from blind hole 1 that accumulate after the modification of said blind hole 1. To this end, the cleaning apparatus 200 shows a pneumatic pipe 210 that can be connected to a pneumatic source (which is not depicted), whose diameter is smaller than the diameter of the blind hole 1 to be cleaned. The cleaning apparatus 200 further shows a suction pipe 220 that can be connected to a vacuum source (which is not depicted), whose diameter is larger than the diameter of the blind hole 1 to be cleaned. One section of the pneumatic pipe 210 runs within the suction pipe 220, with a first end 210a of the pneumatic pipe 210 projecting beyond a first end 220a of the suction pipe 220 in longitudinal direction of the pneumatic pipe. This way, the first end 210a of the pneumatic pipe 210 can be introduced far into the blind hole 1, with the first end 220a of the suction pipe 220 remaining at the open end of the blind hole 1. A compressed air pipe 211 connects to a second end 210b of the pneumatic pipe 210, which can be used to connect the pneumatic pipe 210 to a pneumatic source (which is not depicted). The compressed air pipe 211 and pneumatic pipe 210 can be used to introduce compressed air D to the closed end of the blind hole 1, and the compressed air can then be sucked off as suction air S via the suction pipe 220 that is arranged at the opening of blind hole 1. This allows for creating an air current from the closed end of the blind hole 1 to the open end which will pick up the cuttings X and remove them from the blind hole.

Figure 4:
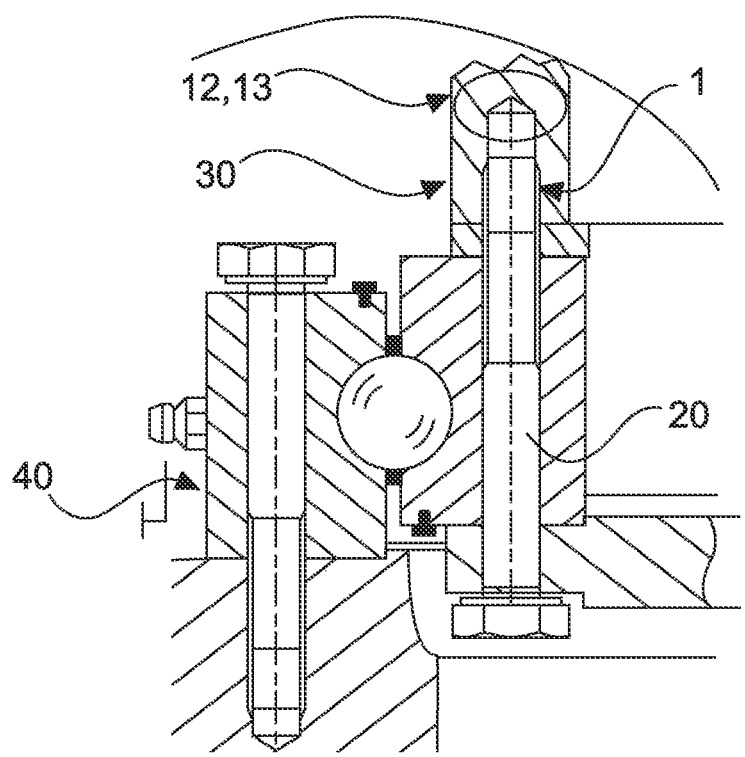
FIG. 4 shows a blind hole in a blade root insert with a screwed in blade screw that is to be modified.

FIG. 4 shows a blind hole 1 in a pitch insert 30, with the end section 12 and the hole bottom 13 being emphasized by a ring. A blade screw 20 is engaged with the blind hole 1. The number 40 marks the pitch. FIG. 4 shows the blind hole 1 prior to its modification. The square, not rounded edge between the end section and the hole bottom is already visible in FIG. 4.

The blade root inserts are normally made of aluminum or comprise aluminum. What is particularly preferred is an aluminum-manganese alloy, such as AlMg5.

Figure 5:
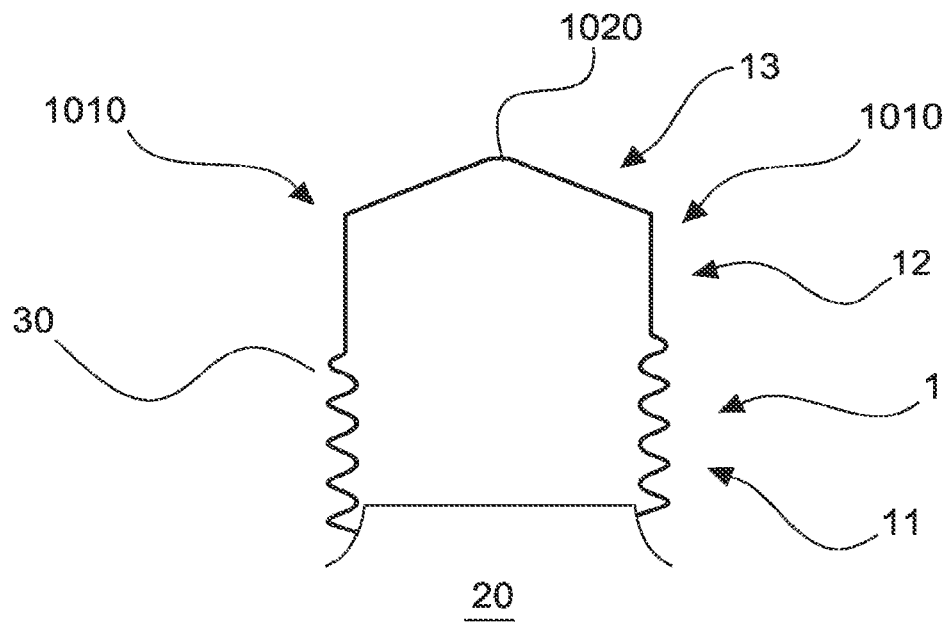
FIG. 5 shows the end of a blind hole with a screwed in blade screw that is to be modified.

The advantage of the drilling tool and method for modifying a blind hole becomes evident, in particular, when comparing FIGS. 5 and 6: FIG. 5 shows the blind hole 1 in its original, i.e. still unmodified state. The blind hole 1 comprises a thread section 11, an end section 12 following such thread section, and a hole bottom 13 following such end section which is tapered towards the closed end of the blind hole 1. The transition in form of a square edge 1010 from end section 12 to hole bottom 13 is clearly visible. The closed end of the hole bottom 13 shows a hole bottom tip 1020.

FIG. 6 shows the blind hole 1, which is depicted in FIG. 5, after modification. When comparing FIGS. 5 and 6, it becomes evident, in particular, that the end section 12 which follows thread section 11 is longer after modification, as marked by reference numbers 12' in FIG. 6. One can also see that a rounded transition 1010' with a 4-mm radius was created at the transition between the prolonged end section 12' and the newly created hole bottom 13', which was produced by the drilling tool shown in FIGS. 1 and 2 without widening the blind hole 1 radially. The hole bottom tip 1020' is also rounded due to the rounded dead center 150 of the drilling tool 100 shown in FIGS. 1 and 2. This prevents the blade root insert 30 from becoming weaker in radial direction. At the same time, the risk of cracking is clearly reduced thanks to the rounded transitions 1010'.

Figure 7:
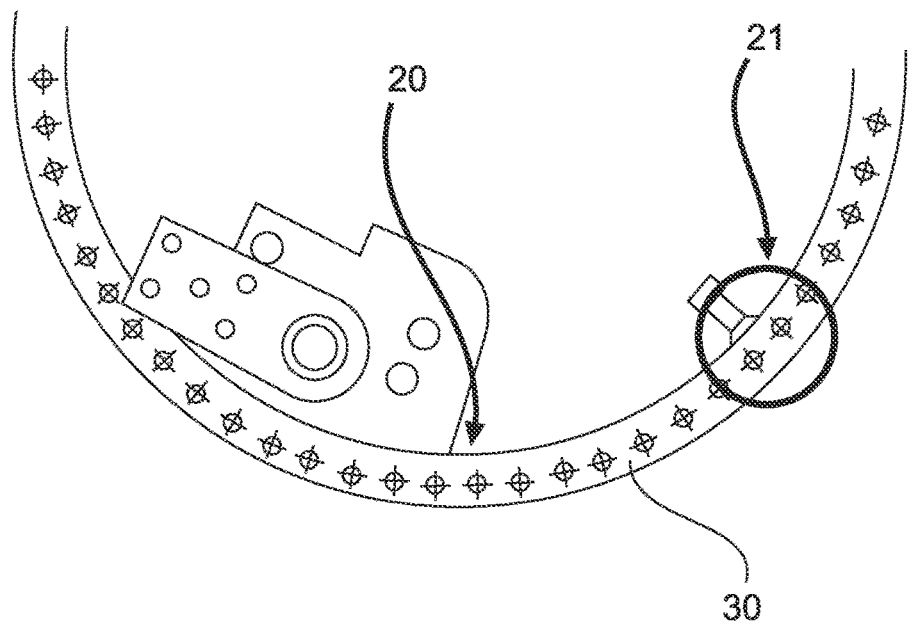
FIG. 7 shows part of a blade root insert with a plurality of screwed in blade screws.
Figure 8:
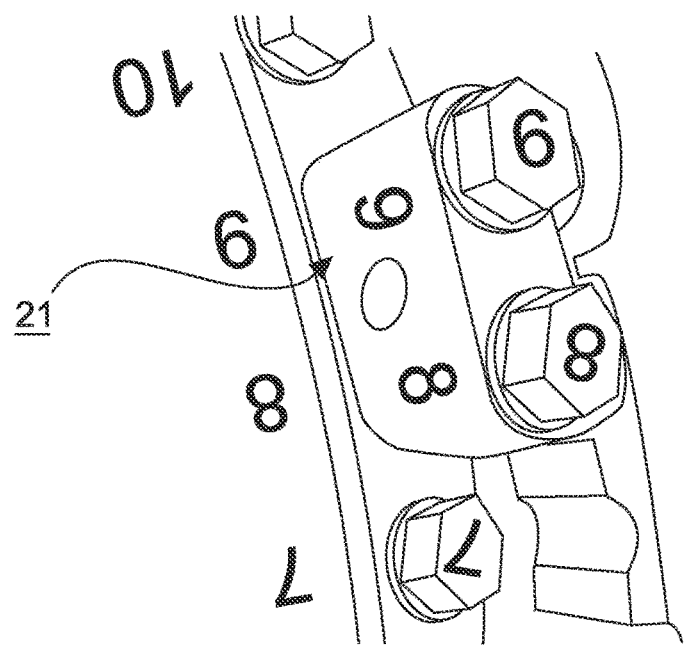
FIG. 8: shows the three-dimensional view of the blade screws of the rotor blade stop that are encircled in FIG. 7.

FIGS. 7 and 8 show a plurality of blade screws 20 screwed into the blind holes of a pitch insert 30. To modify a plurality of blind holes one can remove one part of all pitch screws 20 of a pitch insert 30 to make the respective blind holes accessible for modification, however without having to dismount the rotor blade. To this end, it is particularly preferred to remove every other or third blade screw 20 from the respective blind hole, to modify said blind holes and to then return the blade screws in order to then remove the blade screws from the still unmodified blind holes in a next method cycle, to subsequently modify said blind holes as well, and to then finally return the blade screws 20. Preferably, the blade screws 21 of the rotor blade stops are removed together or in pairs.

Preferably, the blade screws and the blind holes are numbered before the blade screws are removed (see FIG. 8).

REFERENCE NUMBERS

1 Blind hole
11 Thread section
12, 12' End section
13, 13' Hole bottom
20 Blade screw
21 Blade screws of the rotor blade stop
30 Blade root insert
40 Pitch
100 Drilling tool
110 Drill section
120 Handling section
121 External thread
130 Drill bit
140 Main cutting edge
141 Rounded outer end
150 Dead center
160 Minor cutting edge
170 Adjuster
200 Cleaning apparatus
210 Pneumatic pipe
210a First end of the pneumatic pipe
210b Second end of the pneumatic pipe
211 Compressed air pipe
220 Suction pipe
220a First end of the suction pipe
1010 Unrounded edge
1010', 1020' Rounding
1020 Unrounded tip
D Compressed air
X Cuttings

The invention claimed is:

1. Method for modifying a blind hole having a thread section, an end section following such thread section, and a hole bottom following such end section in a blade root insert of a wind turbine with a rotor blade being in mounted position, comprising:
  removing a blade screw located in the blind hole,
  inserting a drilling tool into the blind hole,
  fixing the drilling tool in a drill, recessing the blind hole by a predetermined depth, with a maximum diameter of the end section and of the hole bottom after recessing being smaller than or equal to a diameter of the end section prior to recessing and a transition from the end section to the hole bottom being round after recessing, with a radius of at least 2 mm, removing the drilling tool and the drill, mounting the blade screw in the modified blind hole.

2. Method according to claim 1, characterized by:

cleaning the blind hole after recessing, by introducing compressed air into the area of the end section and/or hole bottom of the blind hole and sucking off air in the area of one opening of the blind hole by means of a cleaning apparatus.

3. Method according to claim 1, characterized by:

checking the end section and/or hole bottom of the blind hole for possible cracks in the blade root insert prior to recessing the blind hole, which checking is to be performed by means of an eddy current test.

4. Method according to claim 1, characterized by:

checking the end section and/or hole bottom of the blind hole for asperities after recessing the blind hole, with such checking to be performed by means of videoscopy.

5. Method according to claim 1, characterized by:

documenting the end section and/or hole bottom of the blind hole after recessing the blind hole, wherein the documenting comprises taking photographs of the blind hole.

6. Method according to claim 1, characterized by:

adjusting the predetermined depth at the drilling tool prior to recessing of the blind hole by means of an adjuster, with such adjustment to take place before the drilling tool is fixed in the drill.

7. Method according to claim 1, wherein the radius is at least 4 mm.

8. Method according to claim 1, wherein mounting the blade screw in the modified blind hole includes taking into account a maximum torque.

9. Method according to claim 1, characterized in that a crack in the blade root insert detected during inspection of the end section and/or hole bottom is closed with a welding seam, with such welding of cracks in the blade root insert to take place before recessing the blind hole.

10. Method according to claim 9, characterized in that a cooling element is arranged between the prepared welding seam and a glass-fiber reinforced plastic (GRP) bond of the rotor blade, and that a temperature is captured and documented during welding.

11. Method for modifying a plurality of blind holes in the blade root insert of the wind turbine, with the rotor blade being in mounted position: comprising:

removing one part of a plurality of the blade screws located in the corresponding blind holes in the blade root insert, including removing the blade screws from every other blind hole, with the blade screws and/or blind holes having been previously numbered, modifying the blind holes from which the blade screw was removed according to the method for modifying a blind hole according to claim 1.

12. Method according to claim 11, characterized in that two adjacent blade screws of a blade stop are removed in pairs.

* * * * *